(12) United States Patent
Petryna

(10) Patent No.: US 6,247,491 B1
(45) Date of Patent: Jun. 19, 2001

(54) CHILDPROOF COVER FOR COMPRESSED GAS VALVES

(76) Inventor: Thomas M. Petryna, 615 Guy Street, Cornwall, Ontario (CA), K6H 4V9

( * ) Notice: Subject to any disclaimer, the term of this patent is extended or adjusted under 35 U.S.C. 154(b) by 0 days.

(21) Appl. No.: 09/609,463

(22) Filed: Jul. 3, 2000

(51) Int. Cl.⁷ .............................. F16K 35/00; B65D 25/00
(52) U.S. Cl. ........................... 137/382; 220/727; 220/728
(58) Field of Search ........................... 137/382; 220/724, 220/725, 726, 728, 727

(56) References Cited

U.S. PATENT DOCUMENTS

| | | | |
|---|---|---|---|
| 4,301,828 | 11/1981 | Martin, Jr. | 137/381 |
| 4,352,370 | 10/1982 | Childress | 137/382 |
| 4,501,370 | 2/1985 | Kelley | 215/219 |
| 4,678,003 | 7/1987 | Griffin | 137/382 |
| 4,854,459 | 8/1989 | DeJonge | 215/220 |
| 5,152,314 | * 10/1992 | Yandle, III | 137/382 |
| 5,546,977 | * 8/1996 | Chaney | 137/382 X |

* cited by examiner

Primary Examiner—Kevin Lee
(74) Attorney, Agent, or Firm—James W. Kayden; Thomas, Kayden, Horstemeyer & Risley

(57) ABSTRACT

A childproof cover for use with a compressed gas cylinder having a shut-off valve inhibits access to the valve. The childproof cover is especially intended for use with propane cylinders for barbecues. The cover includes a housing that surrounds the valve and an open top end for access to the valve. One embodiment of the cover includes a threaded cap that closes the open top end. The cap is adapted to be removed only when a certain force is applied to the cap. Another embodiment of the cover includes a hinged cap with a clip member for securing the cap to the housing. The cover efficiently safeguards the valve from manipulation by children and can be fabricated from molded thermoplastic or metal parts at low cost.

11 Claims, 5 Drawing Sheets

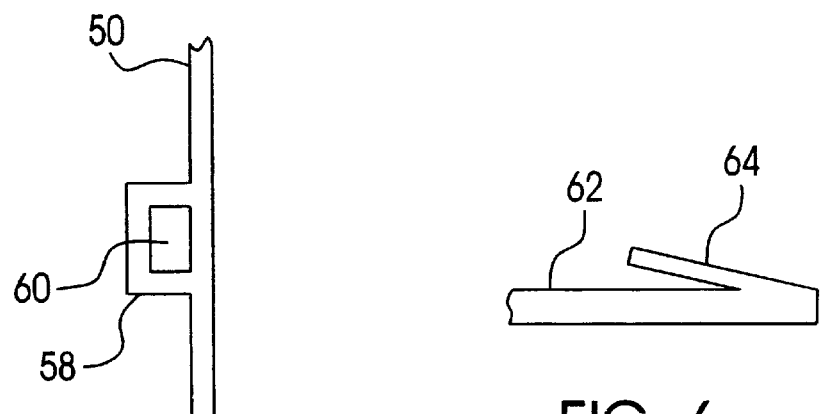
FIG. 5
FIG. 6
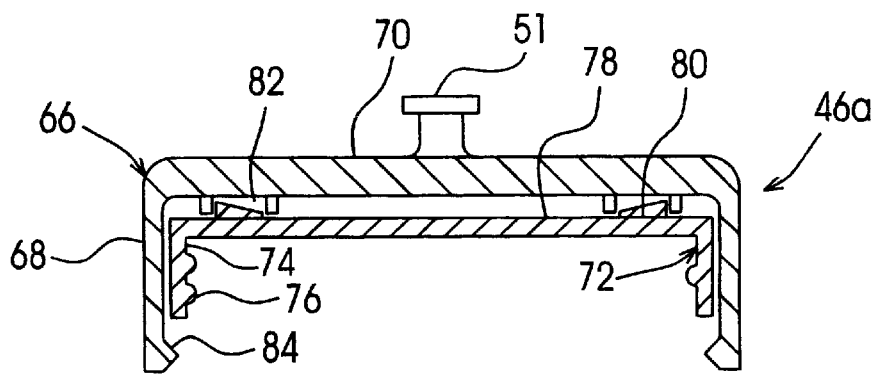
FIG. 7
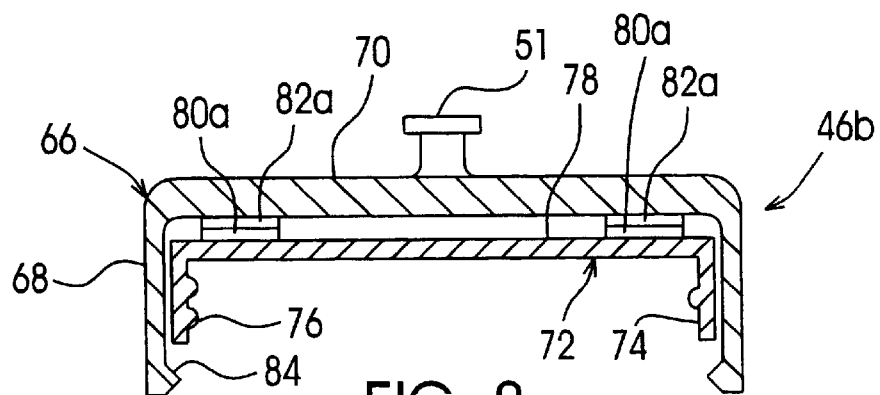
FIG. 8

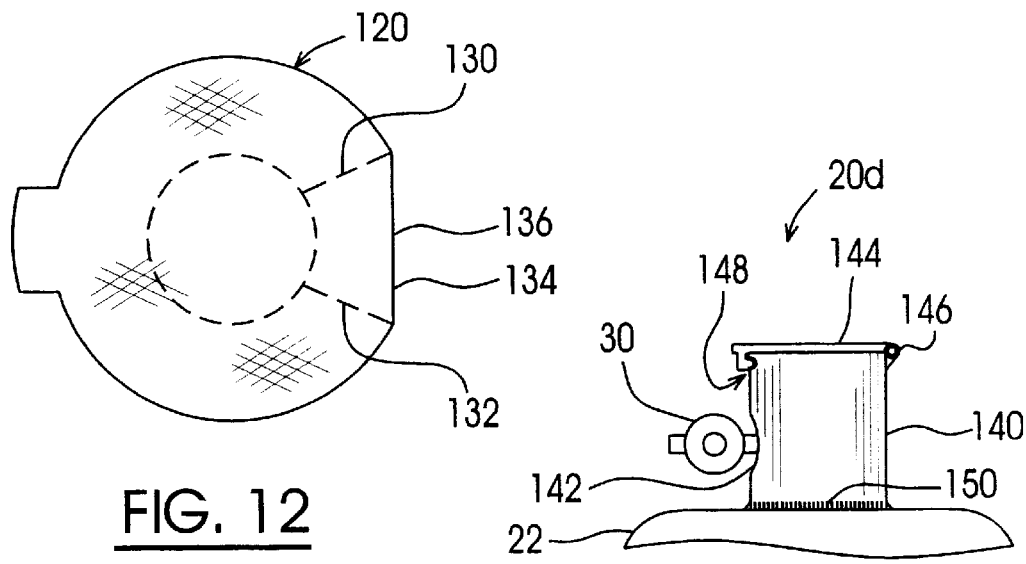
FIG. 12
FIG. 14
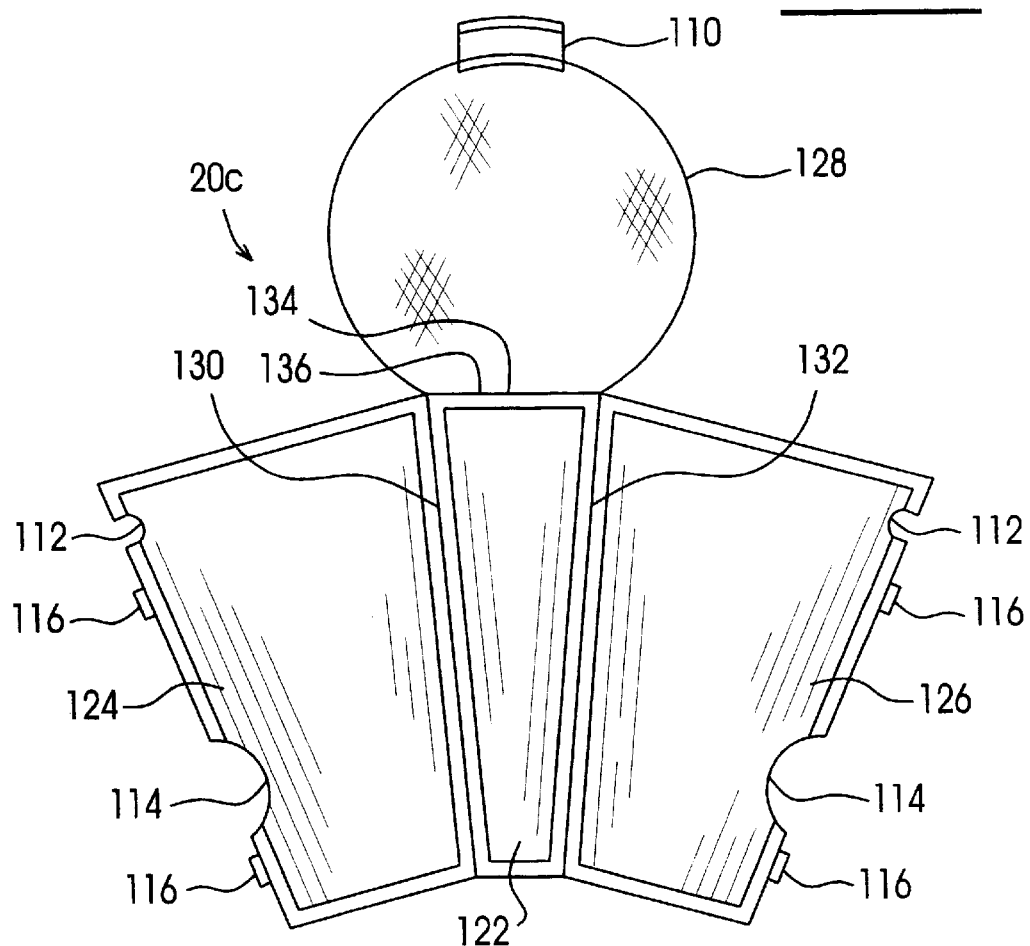
FIG. 13

CHILDPROOF COVER FOR COMPRESSED GAS VALVES

FIELD OF THE INVENTION

This invention relates to safety covers for valves on compressed gas cylinders to inhibit access to the valves, and in particular, to a cover secured over the valve of a compressed gas cylinder used for barbecues in order to prevent manipulation of the compressed gas valve by a child, for example, who may turn on the gas when the appliance is not to be ignited.

BACKGROUND OF THE INVENTION

High pressure gas cylinders store industrial and welding gases, carbon dioxide, oxygen, propane, nitrogen, argon, freon, helium, hydrogen, etc. It is also popular to use high pressure gas cylinders for domestic purposes, such as propane gas cylinders for barbecues. Such cylinders are normally installed on the barbecue ready for use. In such installations the valve is exposed and may be opened without lighting the appliance. Consequently, children may inadvertently turn on the gas. If gas is supplied to a barbecue when it is not lit, the gas can leak into the atmosphere, potentially creating a very hazardous situation.

There is therefore a need for a safety cover for use with the shut-off valve on a compressed gas cylinder to protect against access to the valve. Safety covers for use with shut-off valves on compressed gas cylinders are known and described in the prior art.

For example, Griffin in U.S. Pat. No. 4,678,003, entitled SAFETY CAP FOR VALVE ON HIGH-PRESSURE CYLINDER, which issued on Jul. 7, 1987, describes a safety cap for protecting against damage and tampering of the shut-off valve of a high pressure gas cylinder. The cylinder has a threaded neck, such as an acetylene or oxygen cylinder for welding. The safety cap is connected to the neck by a threaded base, which engages the male threaded neck ring of the gas cylinder. A shield for the valve is hingedly connected to opposite sides of the base member. The shield may be closed over the valve and secured in a closed position by positive-lock hinged clamps which engage slots formed in the shield halves.

Another example is described in U.S. Pat. No. 4,352,370 which is entitled PRESSURE VESSEL VALVE HOUSING, issued Oct. 5, 1982 to Childress. This patent describes a valve housing for a gas tank, such as a welding gas tank that includes a pressure regulator. The cover is designed to inhibit tampering and/or illegal appropriation of gas from the cylinder. A clamp strap surrounds a top of the tank and one half of the housing is mounted to the strap. The opposite half of the housing is hingedly mounted to the first half and a hasp mounted to the second half permits a padlock to be inserted through the strap to lock the housing in a closed condition.

The safety covers described above are designed for use with industrial equipment and are therefore unsuited for domestic use with propane cylinders. Consequently, there exists a need for a safety cover for the valve of a propane cylinder designed for use to supply fuel gas to a barbecue. Preferably, the safety cover inhibits access to the valve without reliance on locks or other complex mechanisms that tend to discourage use in a domestic environment.

SUMMARY OF THE INVENTION

It is therefore an object of the invention to provide a childproof cover for use with a compressed gas cylinder having a shut-off valve to inhibit children from accessing the valve.

It is another object of the invention to provide a childproof cover for a shut-off valve on a compressed gas cylinder that can be fabricated at low cost.

In accordance with one aspect of the invention, a childproof cover for use with a compressed gas cylinder having a shut-off valve is provided. The valve has a longitudinal axis, a valve stem aligned with the axis and a radial outlet port. The cover comprises a housing attached to the cylinder and surrounding the valve. The housing has an open top end to provide access to the valve, and an opening in the side wall of the housing to provide access to the outlet port. The cover further includes a cap adapted to be secured to the housing for closing the open top end of the housing to block access to the valve. Means are provided for securing the cap to the open top end of the housing so that one of strength and ingenuity not normally expected of a child is required to remove the cap. Preferably, the housing is removably attached to the cylinder.

In accordance with one embodiment of the invention, the housing comprises two shells hinged along one side to permit the shells to be pivoted about the hinge between a closed position for surrounding the valve and an open position for removing the valve from the cylinder. The housing is preferably cylindrical or conical and includes a lock mechanism for detachably locking the shells in the closed position.

In accordance with a first embodiment of the invention, the housing has an inverted conical shape. The conical housing preferably includes two shells hinged along one side so that the shells may be pivoted about the hinge between a closed position for surrounding the valve and an open position for removing the housing from the cylinder. A cap is secured to a top end of the housing. The cap is designed to engage a top end of the housing so that removal of the cap requires a certain strength and/or ingenuity not normally expected of children.

In accordance with another embodiment of the invention, the housing is cylindrical and the cap threadedly engages the top end of the housing. The cap is childproofed in any one of several ways used, for example, to seal drug or poisonous fluid containers. In a preferred embodiment the cap includes an inner part having a top, a cylindrical side wall and threads on the interior of the side wall for engaging complementary threads around the open end of the housing, and an external part having a top wall and a cylindrical side wall. The external part is located and fitted loosely about the inner part and rotatable with respect to the inner part. Frictional engagement or ratchet segments are provided between the inner and outer parts of the cap so that the inner part rotates together with the outer part when the outer part is pressed downwardly. The cylindrical housing has a bottom wall with an opening therein to accommodate the valve while preventing the removal of the housing from the cylinder when the shells are in the closed position.

The childproof cover in accordance with the present invention can be fabricated from plastic material at low cost. The childproof cover efficiently safeguards the shut-off valve on a propane cylinder from manipulation by a child. Other features and advantages will be better understood with reference to the detailed description of the preferred embodiments of the invention.

BRIEF DESCRIPTION OF THE DRAWINGS

The invention will now be described by way of example only, and with reference to the accompanying drawings in which:

FIG. 5 is an enlarged view, taken in a direction indicated by arrow A of FIG. 4, showing details of a female part of a latch mechanism for securing shells of the housing together;

FIG. 6 is an enlarged view, taken in a direction indicated by arrow B of FIG. 4, showing a male part of the lock mechanism for securing the shells of the housing together;

FIG. 7 is a cross-sectional view of an exemplary embodiment of a cap used to close the housing shown in FIG. 2;

FIG. 8 is a cross-sectional view of another embodiment of a cap used to close the housing shown in FIG. 2;

FIG. 12 is a top plan view of another embodiment of the invention;

FIG. 13 is a front elevational view of the embodiment of the invention shown in FIG. 12, the housing and the cap being shown in an open condition; and FIG. 14 is a side elevational view of another embodiment of the invention in which the childproof cover is permanently affixed to a top of the compressed gas cylinder.

DETAILED DESCRIPTION OF THE PREFERRED EMBODIMENTS

The invention provides a protective cover for inhibiting access to the valve of a compressed gas cylinder, such as a propane cylinder used for storing a fuel supply for an appliance such as a barbecue grill.

Figure 1:
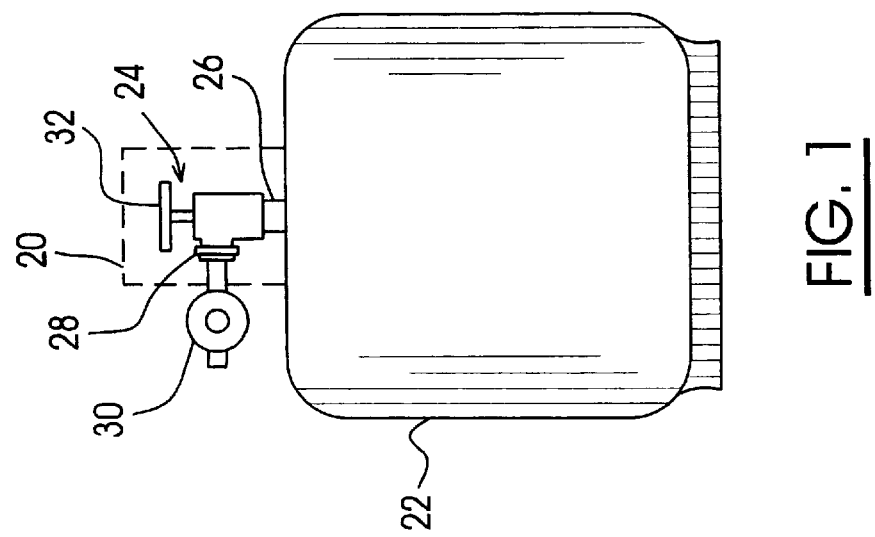
FIG. 1 is an elevational side view of a compressed gas cylinder used with barbecue grills, with a childproof cover in accordance with one embodiment of the invention schematically illustrated in dashed lines.

As shown in FIG. 1 of the drawings, reference numeral 20 generally indicates a childproof cover in accordance with the invention. The childproof cover is mounted to a compressed gas cylinder 22, for example a gas cylinder for barbecue grills. The gas cylinder 22 generally includes a shut-off valve 24 having a longitudinal axis, a valve stem 26 aligned with the axis and a radial outlet port 28 to accommodate a connection of a pipeline (not shown) and a regulator 30. The valve 24 is normally surrounded by an upstanding shield that is welded to a top of the tank to protect the valve from impact and to provide handles for handling the tank. The upstanding shield is not shown for clarity of illustration. The valve 24 is adapted to be turned on and off by a valve wheel 32. The childproof cover 20 generally includes a housing structure either fixedly or removably attached to the cylinder 22. The housing surrounds the shut-off valve 24 to block the access to the valve 24 when the cover is closed. The top end of the cover 20 is adapted to be opened for access to the valve 24. Nevertheless, in order to open the top end of the cover 20, a certain amount of strength and/or ingenuity are required, consequently, children are inhibited from accessing the valve when the cover is secured to the housing.

Figures 2, 3, 4:
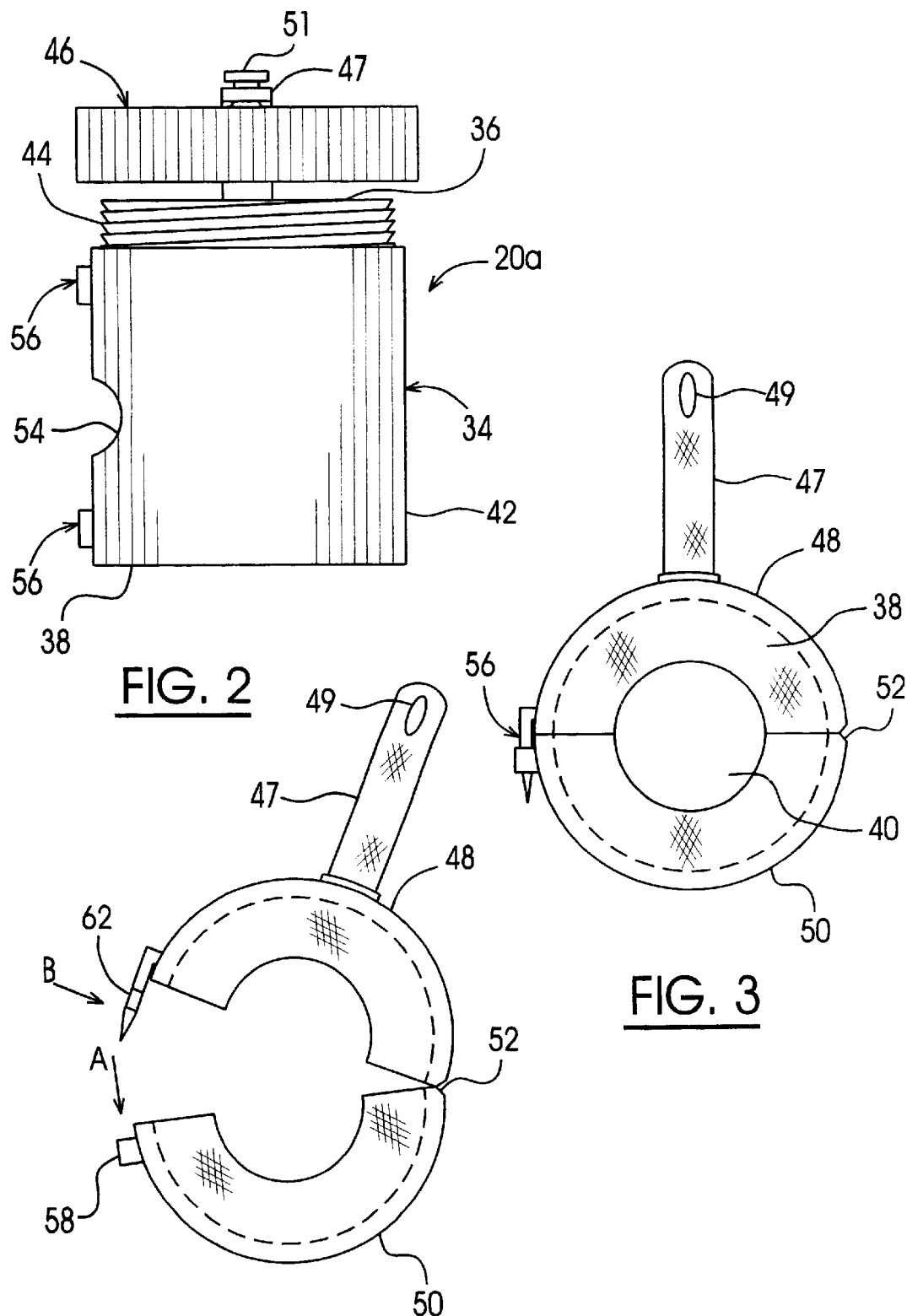
FIG. 2 is a partially exploded elevational view of a first embodiment of the invention shown in FIG. 1.
FIG. 3 is a bottom plan view of the embodiment shown in FIG. 2, with the housing in a closed condition.
FIG. 4 is a bottom plan view of the embodiment shown in FIG. 2, with the housing in an open condition.

FIGS. 2 through 4 illustrate a first embodiment 20a of the invention. The embodiment 20a includes a cylindrical housing 34 having an open top end 36 and a bottom wall 38 with a central passage 40. A cylindrical side wall 42 extends between the bottom wall and the open top end. Threads 44 are provided on an exterior on the open top end 36 for threaded engagement with a cap 46 used to close the open top end 36. The cap 46 is described below in more detail. The cap 46 is preferably rotatably attached to the cylindrical housing 34 so that the cap is not misplaced when it is removed from the housing. For this purpose, a flexible strap 47, which is integrally molded with the housing 34 or adhesively attached, for example, includes a hole 49 in a free end thereof that accommodates a mushroom-shaped boss 51 integrally molded on a top centre of the cap 46. This permits the cap 46 to be freely rotated to engage threads 44 but prevents the cap 46 from being displaced when it is removed from the housing 34 to access the valve 24. The housing 34 is divided into two shells 48 and 50, each shell making up half of the cylindrical housing. The shells 48, 50 are preferably integrally molded from a thermoplastic material so that they are interconnected along one edge by a flexible hinge strip 52. The shells 48, 50 are therefore hinged together and pivotable about the flexible hinge strip 52, so that they are movable between a closed condition shown in FIG. 3 and an open condition shown in FIG. 4.

When the housing 34 is in the open condition, it may be placed over a top of the cylinder 22 surrounding the valve 24. In the closed condition, the housing surrounds the valve 24 and cannot be readily removed. Each of the shells 48 and 50 includes a semi-circular void in the edge opposite the hinged edge. The semi-circular voids 54 in the two shells 48 50 provide access to the radial outlet port 28 to permit the regulator 30 to be connected to the valve 24.

A latch mechanism 56 is provided, preferably at the bottom and top of the housing 34, to secure the two shells 48 and 50 together in the closed condition. Each latch mechanism 56 includes a female member 58 attached to the shell 50. The latch mechanism 56 further includes an elongated male member 62 attached to the shell 48 so that the elongated male member 62 extends through the female member 58 when the shells 48 and 50 are in the closed condition. The elongated male member 62 preferably includes a resilient tab 64 on its free end, as shown in FIG. 6. The resilient tab 64 is compressed inwardly when the elongated male member 62 is inserted into the female member 58. The tab 64 springs back after it passes through a passage 60 in the female member 58 (FIG. 5). The shells 48 and 50 are locked in the closed condition unless the tab 64 is compressed against the male member 62 to permit it to be withdrawn. The housing 34 need not be removed from the cylinder 22 to gain access to the valve 24. It is only removed when it is desired to attach it to a different compressed gas cylinder.

A cross-section of a childproof cap 46a for use with the housing 34 is in shown in FIG. 7. An outer shell 66 includes a top wall 70 with a depending skirt 68. An inner shell 72 includes a top wall 78 with a depending skirt 74. The depending skirt 74 has a threaded inner surface 76. An upper side of the top wall 78 includes ratchet segments 80. The ratchet segments 80 mesh with ratchet segments 82 located on an inner side of the top wall 70. An annular ridge 84 extending inwardly from a lower edge of the depending skirt 68 retains the inner shell 72 within the outer shell 66. The outer shell 66 is free to rotate relative to the inner shell 72, except when the outer shell 66 is pressed downwardly so that the ratchet segments 80, 82 engage. This ensures that the cap 46a can only be removed off from the housing 34 when a downward force is applied to the cap 46 while the cap is rotated in a clock-wise direction.

FIG. 8 is a cross-sectional view of another embodiment 46b of the cap 46 shown in FIG. 2. The structure of the cap 46b is similar to the structure of cap 46a. Instead of ratchet segments, high friction materials 80a and 82a are provided on respective surfaces of the inner shell 72 and the outer shell 66. The high friction materials 80a and 82a function in the same way as the ratchet segments 80, 82.

Figure 9:
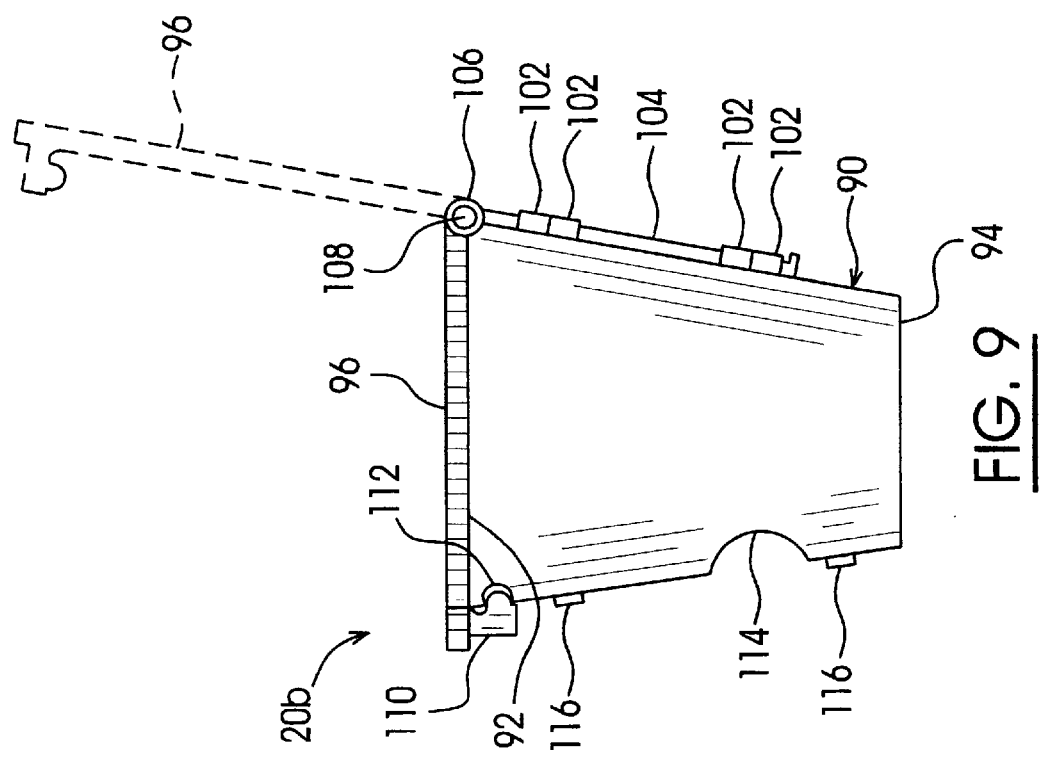
FIG. 9, which appears on sheet one of the drawings, is a side elevational view of another embodiment of the invention.
Figure 10:
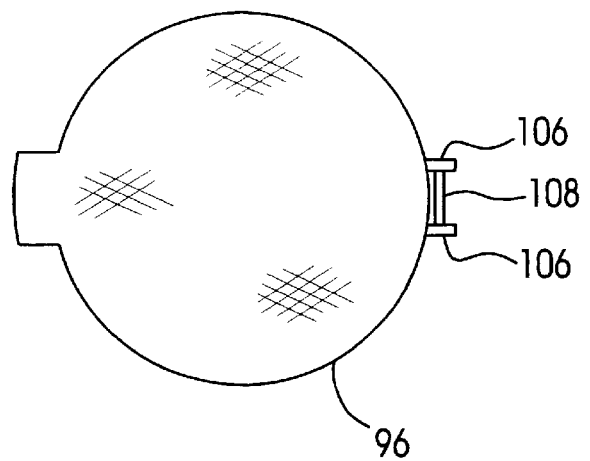
FIG. 10 is a top plan view of the embodiment of the invention shown in FIG. 9.
Figure 11:
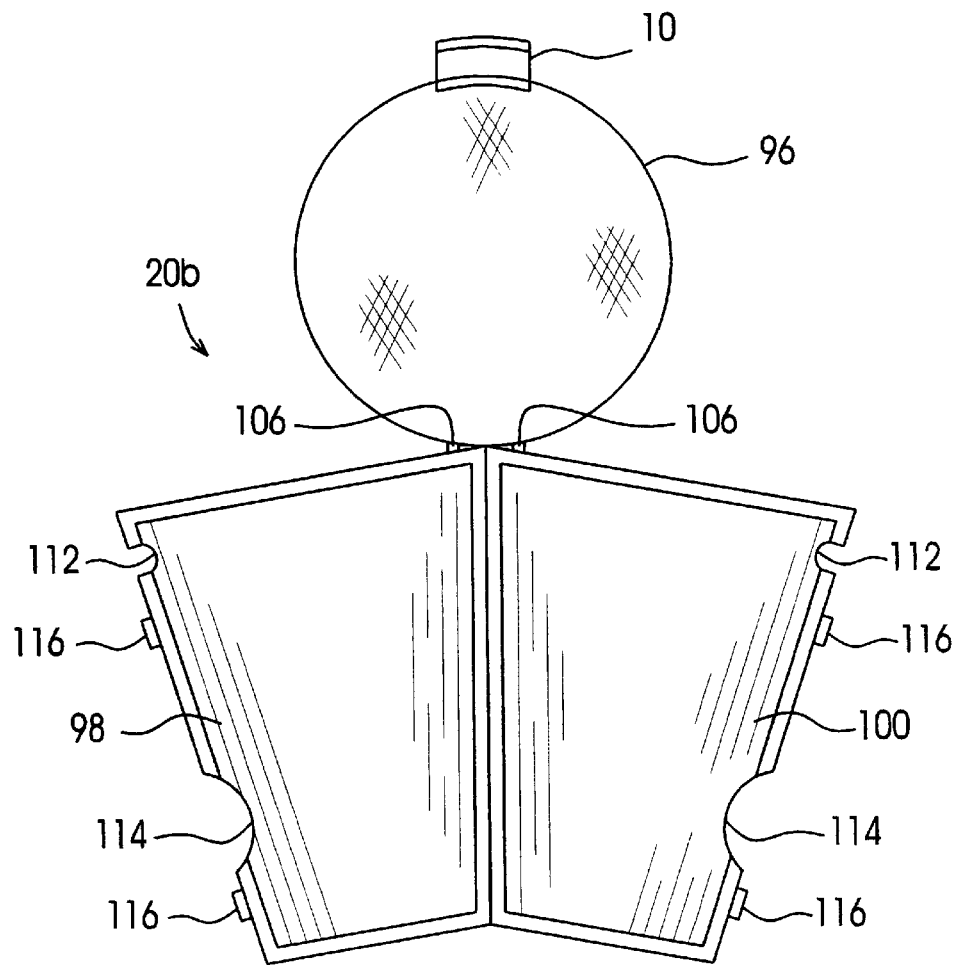
FIG. 11 is an elevational front view of the embodiment of the invention shown in FIG. 9, the housing and the cap being shown in an open condition.

FIGS. 9 through 11 illustrate another embodiment 20b of the invention. A conical housing 90, includes an open top end 92 that is larger than an open bottom end 94. A cap 96 closes the open top end 92. The open bottom end 94 is sized to accommodate the connector 26 that connects the valve 24 to the tank 22. The open top end 92 is sized to provide enough space to enable the wheel 32 of the valve 24 to be opened and closed when a cover 96 is open.

The housing 90 is divided into two shells 98 and 100 which may be independently fabricated from a thermoplastic material. Each of the shells 98, 100 includes hinge members 102 along one edge which are connected by on a hinge pin 104 so that the shells 98, 100 may be pivoted about the hinge pin 104 between the closed condition shown in FIG. 9 to surround the valve 24, and an open condition shown in FIG. 11 in which the cover 20b may be removed from the cylinder 22.

A cover 96 is preferably molded from a thermoplastic material and includes hinge members 106 that are integral with a rear edge of the cap 96. The hinge members 106 are connected to a T-shaped hinge pin 108 so that the cap 96 may be rotated to a closed position to block access to the valve 24. The cover 96 may also be pivoted to an open position as shown in broken lines, in FIG. 9, to provide access to the valve 24. The cap 96 includes an inwardly protruding clip 110 that detachably engages a groove 112 formed in an exterior surface of the open top end 92 of the housing 90 when the cap 96 is in the closed position. The groove 112 is formed in each of the shells 98, 100. The clip 110 engages the groove 112 with adequate frictional force that the cap 96 is not easily detached from the housing. A semi-circular void is also provided in front edges of the shells 98, 100 to form a passage 114 when the shells 98, 100 are closed. The passage 114 provides access to the radial outlet port 28 of the valve 24. Similar to the latch mechanisms 56 shown in FIGS. 2 through 6, latch mechanisms 116 are also provided on the first edge of each of the shells 98 and 100 to secure the two shells together in the closed condition.

Another embodiment of the invention is illustrated in FIGS. 12 and 13. A childproof cover 20c is integrally fabricated from a thermoplastic material. The housing includes a flat side wall 122, flanked by two shells 124, 126, and a cap 128 hinged to a top edge of the flat side wall 122. The shells 124 and 126 are integrally connected to the opposite sides of the flat side wall 122 by flexible hinge strips 130, 132 so that the shells 124 and 126 are hinged to the respective sides of the flat side wall 122. The cap 128 has a straight rear edge 134 that is hinged to the top edge of the flat side wall 122 by a flexible hinge strip 136, so that the cap 128 can be rotated from an open to a closed position. This structure permits childproof cover 20c to be manufactured from a molded thermoplastic as an integral unit. Labour costs are thereby reduced. The other components and their function are the same as described with reference to the embodiment shown in FIGS. 9 through 11.

FIG. 14 is a side elevational view of a further embodiment of the invention in which a childproof cover 20d is permanently affixed to a top of the compressed gas cylinder 22, for example by welding. The childproof cover 20d includes a cylindrical housing 140 preferably constructed from sheet steel, or the like. The housing 140 includes a circular passage 142 to provide access to the radial port 28 of the valve 24 (FIG. 1). A cap 144, also preferably constructed from a sheet metal, such as steel, is attached to a hinge 146 to permit the cap 144 to be opened to provide access to the valve 24, as explained above. A latch mechanism 148, arranged for example as described above with reference to FIG. 9, secures the cap 144 to the housing 140 so that a force or manipulation that exceeds the strength or skill expected of children is required to open it. The childproof cover is affixed to a top of the compressed gas cylinder 22 by a welding bead 150, for example.

Changes and modifications to the embodiments of the invention described above may be made without departing from the spirit and scope of the invention which are intended to be limited only by the scope of the appended claims.

I claim:

1. A childproof cover for use with a compressed gas cylinder having a shut-off valve, the valve having a longitudinal axis, a valve stem in alignment with the axis and a radial outlet port, the cover comprising:

a conical housing adapted to be attached to the shut-off valve so that the housing surrounds the shut-off valve, the housing having an open top end to provide access to the shut-off valve, an open bottom end sized to accommodate a connector that connects the shut-off valve to the compressed gas cylinder, and a passage in a side wall of the housing to provide access to the outlet port;

a cap hingedly secured to the housing for closing the open top end of the housing to block the access to the valve; and means for securing the cap to the open top end of the housing to inhibit access to the shut-off valve.

2. A childproof cover as claimed in claim 1 wherein the housing comprises two shells hinged at one side thereof so that the shells are adapted to pivot about the hinged side between a closed position for surrounding the shut-off valve and an open position for removal from the cylinder.

3. A childproof cover as claimed in claim 2 wherein each of the shells comprises a semi-circular void at the side opposite to the hinged side to form the passage when the shells are closed.

4. A childproof cover as claimed in claim 2 wherein the housing comprises a lock mechanism for detachably locking the shells in the closed position.

5. A childproof cover as claimed in claim 1 wherein the cap is hinged at a first point on a circumference thereof to a pin secured to a top end of a hinge pin of the shells, the cap being pivotable from an open position to a closed position, the cap including a clip that depends from a second point on the circumference opposite to the first point for removably engaging a recess formed in an exterior of the open top end of the housing when the cap is in the closed position.

6. A childproof cover as claimed in claim 1 wherein the housing and the cap are integrally molded from a thermoplastic, and the housing includes a flat side wall section flanked by two shells, the cap having a straight edge hingedly connected to a top of the flat side wall, the shells being respectively hinged to opposite side edges of the flat side wall and pivotable towards each other to form the housing, the cap is adapted to pivot between an open and closed position, and in the closed position the cap engages the housing to inhibit the cap from being removed.

7. A childproof cover as claimed in claim 1 wherein the housing and the cap are constructed using metal.

8. A childproof cover for use with a compressed gas cylinder having a shut-off valve, the valve having a longitudinal axis, a valve stem aligned with the axis and a radial outlet port, the cover comprising:

a housing adapted to be attached to the cylinder and surrounding the valve, the housing having an open top end to provide access to the valve and a passage in a side wall of the housing to provide access to the outlet port; and a cap adapted to be secured to the housing for closing the open top end of the housing to block the access to the valve, the cap including an inner portion having a top, a cylindrical side wall and threads on an interior of the side wall for engaging complementary threads around the open top end of the housing, and an external portion having a top and a cylindrical side wall, the external portion being located and fitted loosely about the inner portion and rotatable with respect to the inner portion unless a force is applied to the external portion to move the external portion into contact with the inner portion.

9. A childproof cover as claimed in claim 8 wherein the housing is cylindrical.

10. A childproof cover as claimed in claim 9 wherein the cap comprises frictional engaging mechanisms between the inner and external portions thereof for detachable engagement of the inner and external portions so that the inner portion is rotated together with the external portion only when the inner and the external portions are frictionally engaged under the force.

11. A childproof cover as claimed in claim 9 wherein the external portion includes ratchet type segments on the interior of the external top wall and the inner portion includes ratchet type segments on the exterior of the inner top wall so that the ratchet type segments of the external and inner portions engage when the force is applied to the cap.

* * * * *